United States Patent

Waggoner

[11] 3,904,806
[45] Sept. 9, 1975

[54] COMPOSITE FILMS OF GLASSINE-POLYOLEFIN COPOLYMER RESINS EXHIBITING HIGH OXYGEN BARRIER CHARACTERISTICS

[75] Inventor: Marion Glen Waggoner, Wilmington, Del.

[73] Assignee: E. I. Du Pont de Nemours and Company, Wilmington, Del.

[22] Filed: Feb. 28, 1973

[21] Appl. No.: 336,765

[52] U.S. Cl. ............... 428/511; 427/211; 428/537
[51] Int. Cl.² ..................... B05C 9/04; D21H 1/40
[58] Field of Search ........ 117/68, 144 UA, 161 UC, 117/161 UH, 76 P

[56] References Cited
UNITED STATES PATENTS

| | | | |
|---|---|---|---|
| 2,300,373 | 10/1942 | Stoner et al. | 117/143 |
| 3,239,370 | 3/1966 | Thomson et al. | 117/155 X |
| 3,264,272 | 8/1966 | Rees | 117/127 X |
| 3,371,002 | 2/1968 | Reddeman | 156/244 |
| 3,485,785 | 12/1969 | Anspon et al. | 260/296 |
| 3,520,861 | 7/1970 | Thomson et al. | 117/161 X |
| 3,674,896 | 7/1972 | Purcell et al. | 117/161 X |
| 3,775,239 | 11/1973 | Snow | 161/250 |

FOREIGN PATENTS OR APPLICATIONS

| | | | |
|---|---|---|---|
| 688,637 | 3/1953 | Greece | 117/155 |

*Primary Examiner*—Michael R. Lusignan

[57] ABSTRACT

Unique, flexible composite films exhibiting high oxygen barrier characteristics making them suitable for use in wrapping foods, particularly fresh foods and vegetables, are described. The composite films are prepared by melt extrusion of uniform, random copolymers of ethylene with from 2 to 20% by weight of an $\alpha,\beta$-ethylenically unsaturated monocarboxylic acid onto one side of glassine paper. In the preferred case, ionomers are employed in which from 10 to 60% of the carboxylic acid moieties in the copolymer are uniformly ionized by association with metal ions having ionized valences of from 1 to 3. Particularly preferred are the zinc or sodium ionomers of ethylene-methacrylic acid copolymers having 5 to 15% by weight copolymerized methacrylic acid. In all cases these composite films are characterized by an average oxygen transmission rate of less than $2(cm^3 \cdot mil)/(100\ in.^2 \cdot 24\ hr. \cdot atm.)$. Using the preferred ionomers, average oxygen transmission rates of less than 0.2 $(cm^3 \cdot mil)/(100\ in.^2 \cdot 24\ hr. \cdot atm.)$ are obtained. It is essential to the achievement of these low oxygen transmission rates that complete and uniform contact of the polyolefin copolymer or ionomer coating be obtained as measured by a peel-strength adhesion sufficiently strong to produce fiber tear in a peel test. The polyolefin copolymer film coating is preferably from about 0.5 to 2 mils in thickness.

4 Claims, 4 Drawing Figures

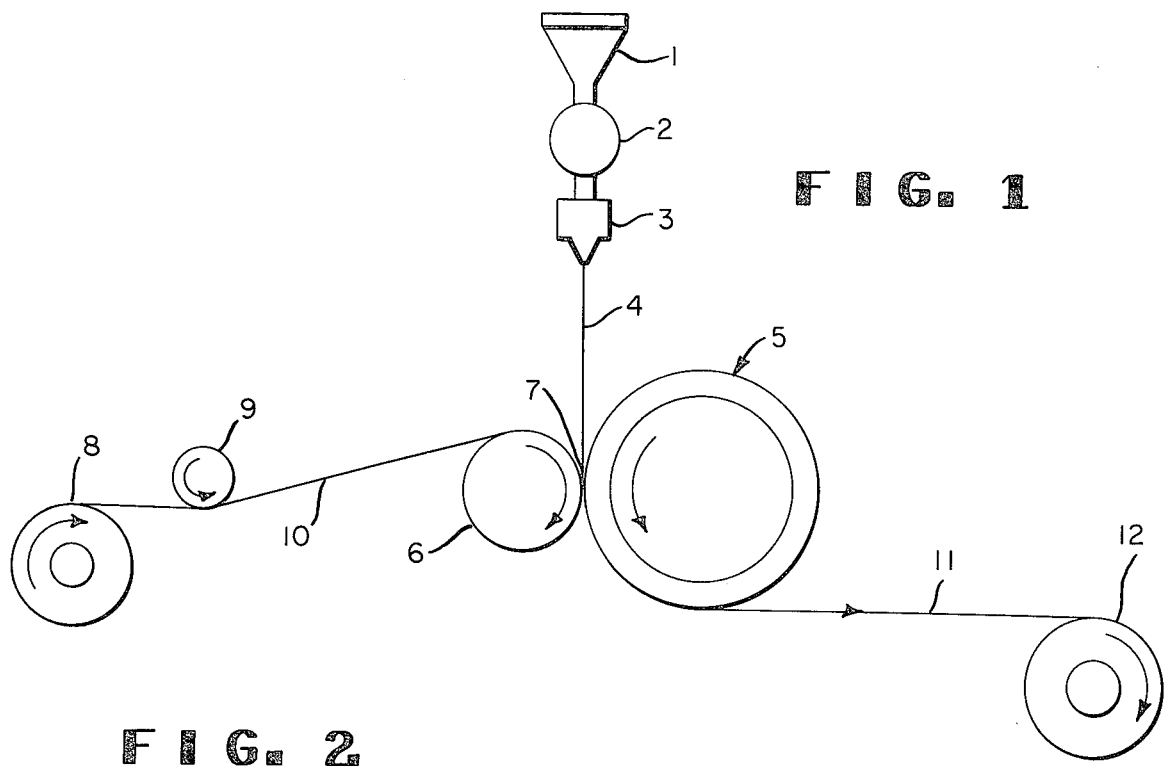

3,904,806

COMPOSITE FILMS OF GLASSINE-POLYOLEFIN COPOLYMER RESINS EXHIBITING HIGH OXYGEN BARRIER CHARACTERISTICS

SUMMARY OF THE INVENTION

The present invention comprises the discovery that translucent, flexible, composite films exhibiting unexpectedly high oxygen barrier characteristics are obtained with a glassine paper coated on at least one side with a strongly adhering polyolefin film consisting essentially of a uniform, random, direct copolymer of ethylene with from about 2 to about 20% by weight of an $\alpha$, $\beta$-ethylenically unsaturated monocarboxylic acid of from 3 to 8 carbon atoms. In the preferred case an ionomer is used as the polyolefin copolymer. Coating is obtained by melt extrusion of the copolymer onto the surface of glassine paper using a standard extrusion coating apparatus employing a chill roll with a matte finish in conjunction with a nip roll to press the molten extruded film against the cold paper. Coatings of from about 0.5 mil to about 2 mils are particularly suitable. It is essential that uniform and complete contact be obtained as measured by uniform high adhesion of the coatings to the glassine substrate. The adhesion must be such as to obtain "fiber tear" adhesion which means that the coating cannot be peeled away without tearing the glassine fibers.

The unique composite films of the invention are characterized by exhibiting an average oxygen transmission rate of less than 2 $(cm.^3 \cdot mil)/(100\ in.^2 \cdot 24\ hr. \cdot atm.)$. In the preferred case ionomers are employed in which the ethylene-acid copolymer is uniformly ionized to from 10 to 60% by association with a metal ion selected from the group having ionized valences of from 1 to 3, inclusive. Flexible, composite films of the present invention, however, can be prepared using the ethylene-$\alpha$, $\beta$-ethylenically unsaturated carboxylic acid copolymer uniformly ionized over the range of 0 to 90% by association with metal ions having ionized valences of from 1 to 3, inclusive. When the preferred ionomers are used, fiber tear adhesion is obtained most readily and the resulting composite films are characterized by an average oxygen transmission rate of less than 0.2 $(cm^3 \cdot mil)/(100\ in.^2 \cdot 24\ hr. \cdot atm.)$.

BACKGROUND OF THE INVENTION

The ethylene-$\alpha,\beta$-ethylenically unsaturated monocarboxylic acid copolymers and the ionomers derived from them by "neutralization" with ionized metal salts are described in Rees, U.S. Pat. No. 3,264,272 patented Aug. 2, 1966. The term "ionomer" is the term applied for such ionic copolymers in which from 10 to 90% of the carboxylic acid groups are ionized by association with metal ions having ionized valences of from 1 to 3, inclusive. Suitable monovalent ions include $Na^+$, $K^+$, $Li^+$, $Cs^+$, $Ag^+$, $Hg^+$ and $Cu^+$; suitable divalent ions include $Be^{+2}$, $Mg^{+2}$, $Co^{+2}$, $Ni^{+2}$, and $Zn^{+2}$; suitable trivalent ions include $Al^{+3}$, $Sc^{+3}$, $Fe^{+3}$ and $Y^{+3}$. The ionization is accomplished by neutralization with ionized metal salts as set forth in Rees, U.S. Pat. No. 3,264,272.

Glassine paper is an article of commerce made by special treatment of a sulfite pulp to yield a translucent paper usually, but not necessarily, having one glossy and one dull side. The ethylene-acid copolymers alone as selfsupporting films do not exhibit good oxygen barrier properties. The oxygen transmission rates of glassine paper alone are so high as to be unmeasurable. Other types of paper such as 30 lb. bond pouch paper, or No. 4,016 Kraft paper, when coated with the ethylene-acid copolymers or ionomers used in the present invention, fail to provide comparable oxygen barrier properties. Similarly, glassine paper coated with low density polyethylene or ethylene-vinyl acetate copolymers yields a laminate exhibiting high oxygen transmission rates as compared with the articles of the present invention. Thus, the glassine-ionomer or glassine-acid copolymer composite structures of the present invention are unique in exhibiting this high oxygen barrier property.

BRIEF DESCRIPTION OF THE DRAWINGS

FIG. 1 is a diagrammatic representation of the melt extrusion coating of glassine paper according to the process.

FIG. 2 illustrates the composite product of the invention.

FIG. 3 illustrates a die-cut sample of the composite suitable for use in making a peel strength test.

FIG. 4 illustrates testing of a composite in a Suter peel-tester.

The processes for melt-extrusion coating of paper and other cellulosic webs are well known in the art. Such disclosures as that of British Pat. No. 688,637, published Mar. 11, 1953 and U.S. Pat. No. 3,371,002, patented Feb. 27, 1968 are illustrative. The process can be described by reference to FIG. 1, a diagrammatic representation of the melt extrusion coating of glassine paper to produce the composite structures of this invention. Referring to FIG. 1, molding granules of the said copolymer or ionomer are fed through hopper 1 to screw-extruder 2 and extruded through slit die 3 to yield a molten film 4 of the polymeric resin. The molten film passes into the nip 7 between chill roll 5 and pressure roll 6. The glassine paper web 10 is fed from roll 8 past guide roll 9 to the same nip 7 between roll 6 and chill roll 5. At said nip 7 the paper web is pressed against the hot side of molten resin film 4 which is cooled on the other side by chill roll 5. The composite 11 is passed from chill roll 5 after having been in contact therewith for at least one-fourth of its circumference to wind-up roll 12. Optimum adhesion between the glassine and the polyolefin resin (acid copolymer or ionomer) is achieved by adjusting the melt-temperature, the length of the air-gap between the lip of die 3 and the nip 7 and the pressure of pressure roll 6. Very thin coatings of the polyolefin resin on the glassine are obtained by operating the pressure roll-chill roll assembly at higher line speeds than the linear rate of extrusion of molten film 4.

The composite product is illustrated in FIG. 2 in which component 13 is the polyolefin resin and 14 is the glassine paper. This composite exhibits exceptional oxygen barrier properties when extrusion conditions are properly adjusted in accord with standard operating procedures to obtain optimum adhesion (fiber-tear adhesion) at the interface 15 between the glassine paper web 14 and the polyolefin resin coating film 13.

It is known that the copolymers of ethylene with $\alpha,\beta$-ethylenically unsaturated acids are suitable for such extrusion coating onto nonmetallic substrates. The use of the copolymers of ethylene with $\alpha,\beta$-ethylenically unsaturated carboxylic acids as coatings on nonmetallic substrates is described in co-assigned Armitage application, Ser. No. 349,759, filed Mar. 5, 1964 as a continuation-in-part of Ser. No. 119,265, filed June 26, 1961, now abandoned. Similar compositions suitable for extrusion coating on nonmetallic substrates as described in U.S. Pat. No. 3,239,370, patented Mar. 8, 1966.

The degree of adhesion of the polyolefin copolymer to the substrate is measured by a simple peel test. As shown in FIG. 3, specimens 16 suitable for making this adhesion test are die-cut from samples of the composite sheets. The specimens are cut as strips 1 inch wide by 4 inches long. The length is divided at the midpoint between adhering region 23 and nonadhering region 24. The latter can be obtained during the extrusion by insertion of a 2 to 3 inch wide ribbon of nonadhering material, such as polytetrafluoroethylene resin, into nip 7 [FIG. 1] along one edge of the paper web as it enters the nip to prevent the molten polyolefin resin from contacting the paper web in the molten state.

Adhesion testing can be conducted on a Suter peeltester as shown diagrammatically in FIG. 4. The composite sample 16 of FIG. 3 is mounted with the nonadhering portions of the polyolefin resin 17 and the glassine paper 18, respectively, in the opposing grips 19 and 20 of the tester such that the included angle 21 between the direction of pull 22 and the composite adherent sample 16 is 90°C. The tester is operated at a crosshead speed of 12 inches per minute corresponding to a separation rate of 6 inches per minute. The result is recorded in grams of force per inch of width. Generally this will be above 350 grams per inch when fiber-tear adhesion is observed as the appearance of fibers from the paper which remain adhering to the polyolefin resin after separation. However, it is not the absolute magnitude of this peel strength but the observance of the fiber-tear phenomenon which defines the adhesion achieved when the unexpected high oxygen-barrier property of the composite films is observed. Thus, poor adhesion permits peeling of the coating away from the paper without tearing of the fibers of the paper. Satisfactory adhesion required for the articles of the present invention can be determined when, in the peel test, the polyolefin cannot be peeled without tearing the fibers of the paper. This is called fiber tear adhesion.

The oxygen transmission test employed to determine the amount of oxygen barrier provided by the coated glassine paper is set forth in a standard ASTM test No. D-1434, Method V, employing the Linde gas permeation cell. This test measures oxygen transmission rates (OTR) in units expressed as cubic centimeters times mils divided by 100 square inches times 24 hours times atmospheres $[(cm^3 \cdot mil)/(100\ in.^2 \cdot 24\ hr. \cdot atm.)]$. The melt indexes of the copolymers or ionomers are determined by the procedure set forth in ASTM test No. D-1238, Condition E.

DESCRIPTION OF THE INVENTION

The present invention comprises the unexpected discovery that a durable, flexible, composite film consisting of glassine paper coated on one side with an adhering polyolefin film consisting essentially of a uniform, random, direct copolymer of ethylene with $\alpha,\beta$-ethylenically unsaturated monocarboxylic acid of from 3 to 8 carbon atoms, or the metallic salts of these copolymers (ionomers) provides exceptionally and unexpectedly high oxygen barrier characteristics valuable particularly in wrapping films for fresh produce, such as fruits and vegetables. The preferred glassine paper is 30 lb. bond or heavier. The acid copolymers and ionomers employed are such compositions as are described in U.S. Pat. application Ser. No. 349,759, filed Mar. 5, 1964 and in U.S. Pat. No. 3,264,272. Good oxygen barriers are obtained when the glassine is extrusion-coated with a film of from 0.5 to 2 mils thickness of the above-described copolymers using conditions which result in uniform fiber tear adhesion of the polymer to the paper.

Preferably, the polyolefin copolymers employed are the uniform, random, direct copolymers of ethylene with from about 2 to about 20% by weight of an $\alpha,\beta$-ethylenically unsaturated monocarboxylic acid of from 3 to 8 carbon atoms. Particularly valuable composite films of this invention are obtained with the ionomers produced when the polyolefin copolymer has been uniformly ionized with from about 10 to 60% by association with a metal ion exhibiting ionized valences of from 1 to 3, inclusive, in accord with U.S. Pat. No. 3,264,272. Particularly preferred ions are zinc and sodium. However, composite films of this invention can be made from the copolymers which have been ionized over the range of 0 to 90% by association with metal ions having ionized valences of from 1 to 3, inclusive. Where extrusion conditions are adjusted to yield composites exhibiting fiber-tear adhesion, the composite films of this invention are characterized in all cases by an average oxygen transmission rate of less than 1 $(cm^3 \cdot mil)/(100\ in.^2 \cdot 24\ hr. \cdot atm.)$. In the preferred case, ionomers comprising the copolymer of ethylene with 5 to 15% by weight of an $\alpha,\beta$-ethylenically unsaturated monocarboxylic acid of from 3 to 8 carbon atoms, ionized to the extent of 10 to 60% by neutralization with metal salts of zinc or sodium are employed. The average oxygen transmission rate of the resulting ionomer-glassine composite is less than 0.2 $(cm^3 \cdot mil)/(100\ in.^2 \cdot 24\ hr. \cdot atm.)$. Even when the direct copolymer of ethylene with about 5 to 15% by weight of methacrylic acid is employed without any neutralization, an average oxygen transmission rate of 1.0 $(cm^3 \cdot mil)/(100\ in.^2 \cdot 24\ hr. \cdot atm.)$ or less is characteristic of the composite films of this invention.

For the preparation of the composite films of the present invention, any standard extrusion coating apparatus and procedures known to those skilled in the art may be employed. For the acid copolymers in the non-ionized form, melt temperatures in the range of 350°–450°F. are suitable. For the ionomers when employed in preparing the articles of the present invention higher temperatures are required with melt temperatures in the range of 550°–600°F. being suitable. The molten polyolefin copolymer films are contacted with the glassine web by pressing the extrudate film against a chill roll maintained at temperatures in the range of 10° to 20°C. In the preferred case, the chill roll has a matte finish. The molten polyolefin is coated onto either side of the glassine paper. The polyolefin molten film is extruded through a slit die. The resulting composite film is wound up on a suitable wind-up spool.

The polyolefin copolymer resins employed in fabricating the articles of the present invention may have other additives such as slip additives and antioxidants present, as is known to those skilled in the art.

The following Examples are provided to illustrate the invention without any intent to limit the invention thereto. Variations in extrusion procedure would be obvious to those skilled in the art. Any of the composi-

EXAMPLE 1

An ethylene-methacrylic acid copolymer ionomer consisting essentially of 9% by weight methacrylic acid uniformly and randomly copolymerized with ethylene, and ionized to the extent of 15% with zinc ions in accord with procedures described in the disclosure of U.S. Pat. No. 3,264,272 and exhibiting a melt index of 4 was extrusion-coated onto one side of 30 lb. bond glassine paper. The extrusion coater incorporated a 2 ½-inch Egan extruder and an 18 inch flat die with a 20 mil die-gap. Resin melt temperature at extrusion was 590°F. The chill roll employed had a matte finish and was maintained at 11°C. One-mil-thick coatings of the ionomer on the glassine were prepared at a line speed of 255 fpm and with a chill roll nip pressure of 30 psi, in one instance, and 45 psi, in the second instance. Uniform fiber tear adhesion of the coatings to the substrate was obtained at both nip pressures. The oxygen transmission rates of the coatings were measured and found to be less than 0.2 $(cm^3 \cdot mil)/(100\ in.^2 \cdot 24\ hr. \cdot atm.)$.

EXAMPLE 2

An ionomer consisting essentially of the copolymer of 15% by weight methacrylic acid uniformly and randomly copolymerized with ethylene and ionized with sodium ion to the extent of 30% and having a 2.8 melt index was extrusion-coated onto 30-lb. bond glassine paper on the dull side. The melt temperature of the resin at extrusion was 560°F., the die-gap was 20 mils. The matte-finished chill roll was maintained at 18°C. The chill roll nip pressure was 30 psi. A one-mil coating of this ionomer on the side of glassine paper was prepared at a 255 fpm line speed. Under these conditions uniform, fiber tear adhesion of the polymer to the paper was obtained in only a portion of the areas on the glassine surfaces. In other areas, the adhesion was less than fiber tear. In the areas where fiber tear adhesion was achieved, the OTR measured was less than 0.2 $(cm^3 \cdot mil)/(100\ in.^2 \cdot 24\ hr. \cdot atm.)$. This result was achieved with about 50% of the samples. In the other 50% of the samples, where the adhesion was not fiber tear, the OTR's measured ranged from 1.7 to 35 $(cm^3 \cdot mil)/(100\ in.^2 \cdot 24\ hr. \cdot atm.)$. Adjustment of the extrusion conditions to increase the uniformity and completeness of the contact of the molten polyolefin film with the cold glassine surface will produce essentially 100% of composite film exhibiting fiber tear adhesion and OTR of less than 1.0 $(cm^3 \cdot mil)/100\ in.^2 \cdot 24\ hr. \cdot atm.)$.

EXAMPLE 3

A copolymer consisting essentially of 10% by weight methacrylic acid uniformly and randomly copolymerized with ethylene and having a melt index of 35 was employed. This composition was melt extrusion-coated onto 30 lb. glassine paper on one side at a melt temperature of 400°F. using the 18 inch die with a 20 mil die-gap. The matte-finished chill roll was maintained at 12°C., and the chill roll nip pressure was 30 psi. A one-mil coating of this copolymer on the glassine was prepared at a 255 fpm line speed. The adhesion of the polymer to the glassine paper was fiber tear with a few small areas in which the adhesion was slightly less than fiber tear. The coated paper exhibited average OTR's of 1.0 $(cm^3 \cdot mil)/(100\ in.^2 \cdot 24\ hr. \cdot atm.)$.

As is apparent from the three Examples set forth above, it is essential that uniform fiber tear adhesion of the ionomer or acid copolymer to the glassine paper be obtained in order to achieve good oxygen barrier results. Extrusion conditions must be selected and adjusted until such adhesion is achieved. A primary requisite is sufficiently high melt temperature for the particular copolymer or ionomer involved.

In other experiments, glassine paper was coated with low density polyethylene and with ethylene vinyl acetate copolymer. In all cases, the oxygen barriers were poor since the OTR's measured on these composites were of the order of 100 $(cm^3 \cdot mil)/(100\ in.^2 \cdot 24\ hr. \cdot atm.)$. Similarly, when substrates other than glassine paper were extrusioncoated with the ionomers described herein and tested for their oxygen barrier characteristics, it was found that the oxygen barrier was poor. Thus, with 30 lb. bond pouch paper, No. 4016 Kraft paper, and ¾-mil polypropylene, the OTR's measured on composites with the ionomers of Examples 1 or 2 were in the range of 100 $(cm^3 \cdot mil)/(100\ in.^2 \cdot 24\ hr. \cdot atm.)$.

Thus, it has been discovered quite unexpectedly that the glassine-acid copolymer and glassine-ionomer composite structures of the present invention are unique in being characterized by excellent oxygen barrier properties. The OTR of glassine itself is too high to measure in the Linde gas permeation cell. The OTR's of the ionomers and the acid copolymers employed in the present invention measured on self-supporting films of these materials are in the range of about 300–600 $(cm^3 \cdot mil)/(100\ in.^2 \cdot 24\ hr. \cdot atm.)$.

In contrast, when glassine is coated with the polyolefin copolymers described herein under conditions such that the resulting composite structures exhibit fiber tear adhesion of the polymer to the paper, the OTR's measured are in all cases less than 2 $(cm^3 \cdot mil)/(100\ in.^2 \cdot 24\ hr. \cdot atm.)$ and in most cases less than 1 $(cm^3 \cdot mil)/(100\ in.^2 \cdot 24\ hr. \cdot atm.)$. Fiber tear adhesion is obtained by the methods commonly known in the extrusion coating industry involving the use of high melt temperatures, cold matte chill rolls and high chill roll nip pressures. Some resin parameters also affect the degree of adhesion of the resin to the substrate, as is known in the art. High melt index, high acid content acid copolymers will adhere to the glassine better than low melt index, low acid content resins. Similarly, it has been found that the zinc ionomers adhere to glassine slightly better than the sodium ionomers. Thus, for the best oxygen barrier characteristics, a zinc ionomer of a copolymer of ethylene with methacrylic acid is particularly preferred.

The composite film structures of the present invention are particularly useful as wrapping materials where high oxygen barrier characteristics are desired to maintain freshness of the contents. They are suitable, for example, for the packaging of fresh produce and snack foods. Packaging may be achieved readily since these articles may be heat sealed under standard conditions and exhibit excellent flex durability while maintaining good oxygen barrier characteristics after flexing. The coated glassine composite film produces attractive, translucent, strong bags in which the contents are readily visible.

The composite film structures of this invention can also be employed to produce multiple laminate structures of use in packaging foodstuffs. Thus, a glassine-ionomer composite film of this invention can be laminated on the noncoated side with polyolefin films such as high density, linear polyethylene, low-density polyethylene, crystalline polypropylenes and intermediate density ethylene/1-olefin copolymers. Such laminates can be produced by melt extrusion of the polyolefin onto the uncoated paper side of the composite films of this invention, or generally available adhesives for polyolefins can be coated onto the uncoated paper side of the composites which are then contacted with the preformed polyolefin film, either in molten or solid state. Such laminates can be used to make tough pouches or boxes exhibiting high oxygen barrier resistance for frozen foodstuffs. Similarly, the composites of the present invention can be laminated to woven or nonwoven textile fabrics or sheets producing laminates useful to produce bags for packaging foodstuffs or any other product where minimum oxygen contact is desired.

I claim:

1. A translucent, flexible, composite film exhibiting high oxygen barrier characteristics consisting essentially of glassine paper coated on at least one side with an adhering polyolefin copolymer film consisting essentially of a uniform, random, direct copolymer of ethylene with from about 2 to about 20% by weight of an $\alpha,\beta$-ethylenically unsaturated monocarboxylic acid of from 3 to 8 carbon atoms, uniformly ionized to from 0 to 90% by association with metal ions having ionized valences of from 1 to 3, inclusive, said film of a copolymer of ethylene adhering to the glassine with fiber tear adhesion and said composite film being characterized by exhibiting an average oxygen transmission rate equal to or less than 1 $(cm^3 \cdot mil)/(100\ in.^2 \cdot 24\ hr. \cdot atm.)$.

2. A composite film of claim 1 in which the glassine is coated on one side only with the polyolefin copolymer film, said composite film characterized by an average oxygen transmission rate of less than 1 $(cm^3 \cdot mil)/(100\ in.^2 \cdot 24\ hr. \cdot atm.)$.

3. A composite film of claim 2 in which the polyolefin copolymer is a uniform, random, direct copolymer of ethylene with about 5 to 15% by weight of methacrylic acid uniformly ionized to from 10 to 60% by association with a metal ion selected from the group consisting of zinc and sodium, said composite film characterized by an average oxygen transmission rate of less than 0.2 $(cm^3 \cdot mil)/(100\ in.^2 \cdot 24\ hr. \cdot atm.)$.

4. A composite film of claim 2 in which the polyolefin copolymer is a uniform, random, direct copolymer of ethylene with about 5 to 15% by weight of methacrylic acid, said composite film characterized by an average oxygen transmission rate of about 1.0 $(cm^3 \cdot mil)/(100\ in.^2 \cdot 24\ hr. \cdot atm.)$.

* * * * *